United States Patent [19]

Kawabata et al.

[11] Patent Number: 4,913,820

[45] Date of Patent: Apr. 3, 1990

[54] ORGANIC SEWAGE TREATMENT PROCESS

[75] Inventors: Nariyoshi Kawabata, Osaka; Kiyoshi Kuriyama, Kyoto, both of Japan

[73] Assignee: Kyoto Suiken Co., Ltd., Kyoto, Japan

[21] Appl. No.: 381,291

[22] Filed: Jul. 18, 1989

[30] Foreign Application Priority Data

Jul. 22, 1988 [JP] Japan ................................ 63-184243

[51] Int. Cl.⁴ ............................................. C02F 1/56
[52] U.S. Cl. .................................... 210/616; 210/619; 210/631; 210/735
[58] Field of Search ................ 210/609, 711, 615–619, 210/623, 626, 631, 713, 725, 727, 732–735

[56] References Cited

U.S. PATENT DOCUMENTS

| | | | |
|---|---|---|---|
| 3,397,139 | 8/1968 | Sak ........................................ | 210/609 |
| 3,480,144 | 11/1969 | Barth et al. ...................... | 210/631 X |
| 3,846,293 | 11/1974 | Campbell ............................ | 210/631 |
| 3,901,804 | 8/1975 | Ohuchi et al. ...................... | 210/711 |
| 4,053,401 | 10/1977 | Fukushima et al. ................. | 210/728 |

Primary Examiner—Tom Wyse
Attorney, Agent, or Firm—Dennison, Meserole, Pollack & Scheiner

[57] ABSTRACT

A process for treating organic sewage comprises the steps of mixing sewage containing organic pollutants with activated sludge under aerobic conditions, bringing the mixture of the sewage and activated sludge into contact with polyvinyl pyridine, thereby producing floc, and separating the floc from the liquid based on the difference in specific gravity.

7 Claims, 5 Drawing Sheets

ORGANIC SEWAGE TREATMENT PROCESS

BACKGROUND OF THE INVENTION

1. Field of the Invention

The present invention relates to an improved process for treating organic sewage which includes organic pollutants, and more particularly to a sewage treatment process for purifying sewage such as domestic and industrial wastewater by using activated sludge under aerobic conditions.

2. Description of the Prior Art

Various processes have been proposed heretofore for treating organic sewage. One known process is carried out in the following manner using a sewage treatment system such as shown in FIG. 6.

Specifically, organic sewage containing microorganisms is introduced into an aeration tank 51 through an influent pipe 52, and air is supplied to the aeration tank 51 from nozzles 54 of a diffusion pipe 53 connected with a blower (not shown) so as to stir the sewage in the aeration tank 51.

Microorganisms proliferate under aerobic conditions to produce activated sludge, and floc having good adsorptivity is generated which is useful for purifying the sewage.

The sewage including floc is introduced by a guide pipe 55 through a baffle tube 56 into a settling tank 57 where the sewage is separated into clarified liquid 58 and floc sediment 59 based on the difference in specific gravity.

The clarified liquid 58 overflows a water receiving flange 60 in the form of a saucer and is discharged to a predetermined place. The floc sediment 59 is wholly or partly returned to the aeration tank 51 through a recovery pipe 61 provided with a pump 62 to be utilized in the subsequent sewage treatment, or it may be discarded.

Such a process using activated sludge, however, has a limit in its treating capacity.

More specifically, the load of organic pollutants given by biochemical oxygen demand (BOD) per volume per time is generally required to be within the range of 0.3 to 1.0 kg $BOD/(m^3)(day)$. Application of an excess load prevents formation of floc having a good coagulation property and develops a bulking phenomenon. If such bulking occurs, floc fails to settle, so that floc may not be separated in the settling tank 57, and consequently the sewage may not be purified.

Therefore, in the conventional treatment process using activated sludge, the treatment system (particularly the aeration tank) tends to become large in size in order to set the organic load within the safe range to avoid the bulking even when the sewage contains a high concentration of organic pollutants. This has caused increases in cost and space of installation of the treatment system.

SUMMARY OF THE INVENTION

It is, accordingly, an object of the present invention to provide a sewage treatment process which may increase the capacity for treating organic sewage without increasing the size of the treatment system.

In order to achieve the above object, the sewage treatment process according to the present invention comprises the steps of mixing sewage containing organic pollutants with activated sludge under aerobic conditions, bringing the mixture of the sewage and activated sludge into contact with polyvinyl pyridine, thereby producing floc, and separating the floc from liquid based on the difference in specific gravity.

Polyvinyl pyridine (hereinafter referred to as "PVP") is a solid synthetic resin material having a slightly higher specific gravity than water and floc. The PVP may be in the form of particles to be suspended in the mixture of sewage and activated sludge, or it may be coated on a plate, so that the PVP plate can be immersed in the mixture of sewage and activated sludge. Alternatively, a tank to be used for mixing sewage with activated sludge may have its inner walls made wholly or partly of PVP or PVP-coated material.

The PVP supplied in the aeration tank increases the amount of activated sludge in the tank, and the present invention effectively utilizes this function of PVP. The contact area of PVP with the mixture of sewage and activated sludge may be adjusted in response to the amount of the activated sludge. Such adjustment can be achieved by changing the amount and size of PVP particles to be added, or by changing the immersion area of PVP plates through control of vertical movement of the PVP plates.

The invention will become more fully apparent from the claims and the description as it proceeds in connection with the drawings.

DETAILED DESCRIPTION OF THE PREFERRED EMBODIMENTS

Figure 1:
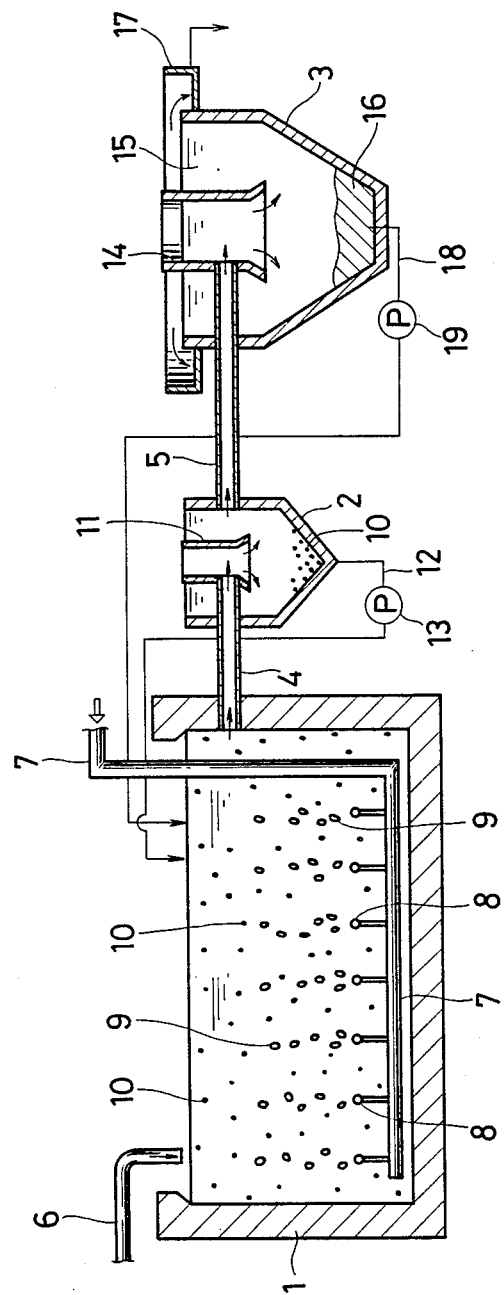
FIG. 1 is a schematic view of a preferred embodiment of the present invention.

Referring to the drawings and to FIG. 1 in particular, shown therein is a sewage treatment system in which the process of the present invention is performed. As shown therein, the sewage treatment system includes an aeration tank 1 and a settling tank 3 designed in the same way as those in the above conventional system. In this system, however, a PVP tank 2 is provided between the aeration tank 1 and the settling tank 3 and is connected to these tanks 1 and 3 through guide pipes 4 and 5.

The aeration tank 1 is supplied with sewage through an influent pipe 6 disposed above the tank 1. A diffusion pipe 7 for delivering air extends along the bottom of the tank 1 and has nozzles 8 for jetting air bubbles 9. The aeration tank 1 is also supplied with particles of PVP 10 which will be described later.

The PVP recovery tank 2 is provided at the upper central portion thereof with a baffle tube 11, so that sewage from the aeration tank 1 may be introduced through the guide pipe 4 into the baffle tube 10. The particles of PVP 10 are settled in the PVP recovery tank 2. A recovery pipe 12 with a pump 13 is provided extending from the bottom of the PVP recovery tank 2 to return the collected PVP particles 10 to the aeration tank 1.

The PVP recovery tank 2 is connected at the upper portion thereof to a baffle tube 14 of the settling tank 3 through the guide pipe 5, so that the sewage in the upper portion of the PVP recovery tank 2 may be introduced into the baffle tube 14 of the settling tank 3. The sewage introduced into the settling tank 3 is separated into clarified liquid 15 and floc sediment 16.

The settling tank 3 is provided around the upper periphery thereof with a water receiving flange 17, so that the clarified liquid 16 in the settling tank 3 may overflow the water receiving flange 17 to be introduced to a predetermined place. A recovery pipe 18 with a pump 19 is provided extending from the bottom of the settling tank 3 to return the collected floc sediment 16 to the aeration tank 1.

With this arrangement, organic sewage such as domestic wastewater is introduced through the influent pipe 6 into the aeration tank 1, and air is supplied thereto through the nozzles 8 of the diffusion pipe 7. At this time, PVP particles 10 in the form of beads are added in the aeration tank 1. The amount and particle size of PVP beads 10 to be added can be freely selected, and, for example, PVP particles having a particle size of 1 to 2 mm may be added in the amount of 1 g per liter of sewage. The specific gravity of PVP is higher than that of sewage, but air bubbles 9 jetted through nozzles 8 stir sewage in the aeration tank 1, so that PVP 10 is not settled but dispersed wholly in the aeration tank 1.

Figure 2:
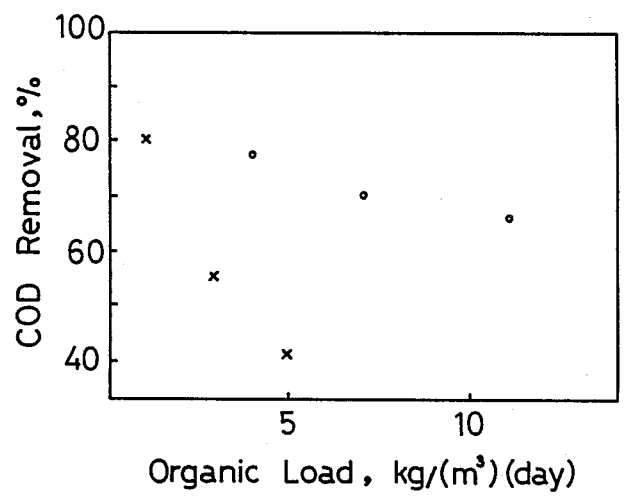
FIG. 2 is a graph illustrating a comparison of the capacity for treating sewage between the present invention and the conventional process.

Thus, under the aerobic conditions prepared by the supplied air and the presence of PVP, activated sludge is mixed with sewage. As a result, the rate of removal of chemical oxygen demand (COD) is remarkably increased, as shown in FIG. 2. FIG. 2 is a graph showing the relation between the organic load $[kg/(m^3)(day)]$ given by COD per volume per time on the axis of abscissa and rates (%) of COD removal on the axis of ordinate. Cross marks in FIG. 2 indicate rates of COD removal in activated sludge process, the conventional process, and small circles indicate rates of COD removal in the process of the present invention (i.e. PVP particles of 0.01 to 2 mm in diameter are added in the amount of 1 g per liter of sewage) carried out under the same conditions. From FIG. 2, it will be seen that even in the process of the present invention performed under high concentration of organic pollutants, for example, with an organic load of 7 $kg/(m^3/(m^3)(day)$ which would cause bulking in the conventional process, the sewage can be satisfactorily clarified without causing a bulking phenomenon. The test results are summarized in Table 1. These results demonstrate that the treated water obtained by activated sludge process where PVP is added in the aeration tank has a lower BOD value than that obtained by conventional activated sludge process without PVP addition.

TABLE 1

| Raw Water BOD mg/l | Detention Period hr | Organic Load kg BOD/ (m³)(day) | Treated Water BOD mg/l | |
|---|---|---|---|---|
| | | | Without PVP Addition | With PVP Addition |
| 1100 | 48 | 0.55 | 17 | 17 |
| 1100 | 24 | 1.1 | 130 | 21 |
| 2200 | 24 | 2.2 | 370 | 45 |

TABLE 1-continued

| Raw Water BOD mg/l | Detention Period hr | Organic Load kg BOD/ (m³)(day) | Treated Water BOD mg/l | |
|---|---|---|---|---|
| | | | Without PVP Addition | With PVP Addition |
| 2200 | 18 | 2.9 | 620 | 81 |

Treatment conditions:
MLSS*:Initial 4900 mg/l, Maximum 12700 mg/l
Aeration:100 Nm³ air/kg BOD to 500 Nm³ air/kg BOD
Amount of PVP beads:1 g per liter of aeration tank
*Mixed Liquid Suspended Solid:it indicates the concentration of activated sludge.

The treating capacity increases with the amount of added PVP. Table 2 indicates the relation between the amount of added PVP beads and BOD of the treated water. It is apparent from Table 2 that the treating capacity increases with the amount of added PVP or contact area therewith.

TABLE 2

| Amount of PVP Beads g/l of Aeration Tank | BOD of Treated Water mg/l |
|---|---|
| 0.5 | 110 |
| 1.0 | 45 |
| 2.0 | 33 |

BOD load:2.2 kg BOD/(m³)(day)

Specifically, in the process of the present invention, application of an organic load drastically exceeding the conventionally suitable load range of 0.3 to 1.0 kg BOD/(m³)(day) which is believed to be a limit to the bulking-free process in the conventional process, does not show a bulking phenomenon. Table 3 shows the relation between the load of BOD and sludge volume index (SVI) of the treated water. The data presented in Table 3 show improved effects of PVP addition as compared with the data in Table 1.

TABLE 3

| BOD Load kg BOD/(m³) (day) | Without PVP Addition | | With PVP Addition | |
|---|---|---|---|---|
| | MLSS mg/l | SVI* | MLSS mg/l | SVI |
| 0.55 | 4900 | 71 | 4900 | 75 |
| 1.1 | 8000 | 121 | 7300 | 55 |
| 2.2 | (12300) partly overflow | fivefold dilution above 300 | 12700 | 61 |
| 2.9 | outflow | — | 10500 (after withdrawal) | 81 |

Treatment condition: PVP; 1 g per liter of aeration tank
*Sludge Volume Index = $\frac{\text{volume of sludge settled in 30 min, \%}}{\text{concentration of sludge in aeration tank, \%}}$ The treated water with floc produced therein in the above process is introduced through the guide pipe 4 into the PVP recovery tank 2 having the baffle tube 11, so that only beads of PVP 10 may be collected based on the difference in specific gravity. The collected PVP 10 can be returned to the aeration tank 1 through the recovery pipe 12.

As shown in FIG. 1, the treated water including floc is further introduced through the guide pipe 5 into the settling tank 3 having the baffle tube 14 to be separated therein into clarified liquid 15 and floc sediment 16 in the same way as the conventional process. The liquid 15 overflows the water receiving flange 17 to be exhausted, and the sediment 16 is returned into the aeration tank 1 through the recovery pipe 18.

As described above, in the process of the present invention, a mere addition of beads of PVP in the aeration tank 1 can enhance the sewage treating capacity without increasing the size of the treatment system. Furthermore, the PVP is dispersed in the aeration tank 1 by the supply of air, assuring uniform contact of PVP with activated sludge, and as the PVP is in the form of beads, the surface area becomes relatively large, permitting effective contact with activated sludge. Thus, the required amount of PVP can be reduced by the addition of PVP in the form of fine particles.

Figure 3A:
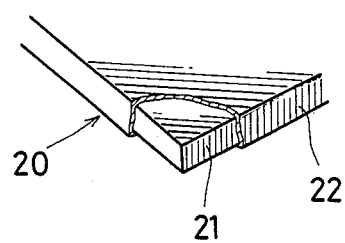
FIGS. 3A and 3B are schematic views illustrating a modification according to the present invention to the embodiment of FIG. 1.
Figure 3B:
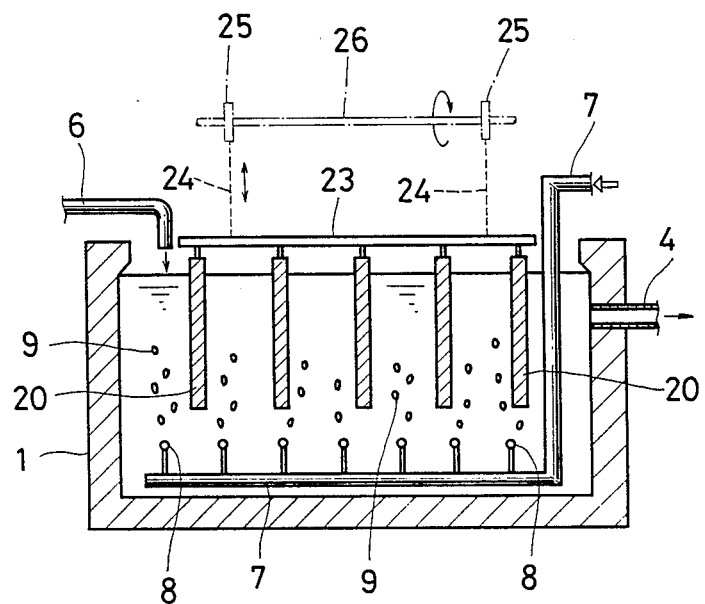

It will be appreciated that modifications may be made in the present invention. For example, as shown in FIGS. 3A and 3B, PVP-coated plates 20 may be used in place of particles of PVP. Specifically, each of the plates 20 includes a base plate 21 of a suitable material coated with PVP 22, as shown in FIG. 3A. The plates 20 are carried by a support member 23 and are immersed into the sewage containing activated sludge in the aeration tank 1, as shown in FIG. 3B. The support member 23 is connected through suspension wires 24 to take-up pulleys 25 carried by a support shaft 26 which can be driven for rotation by a suitable drive (not shown). As the support shaft 26 is rotated, the plates 20 are vertically moved through the wires 24 and the support member 23, so that the immersion depth of the plates 20, or in other words, contact area of PVP with sewage to be treated may be adjustable.

Figure 4A:
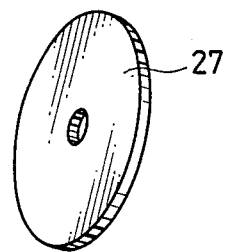
FIGS. 4A, 4B and 4C are somewhat simplified views illustrating a modified arrangement of PVP-coated plates.
Figure 4B:
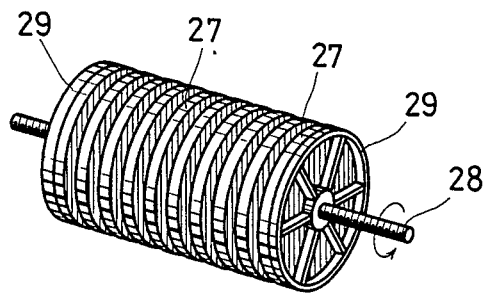
Figure 4C:
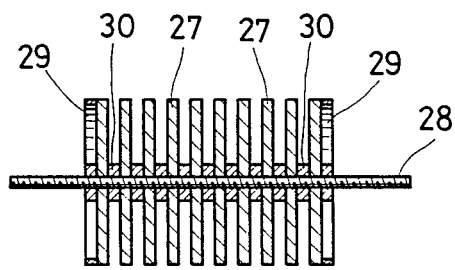
Figure 6:
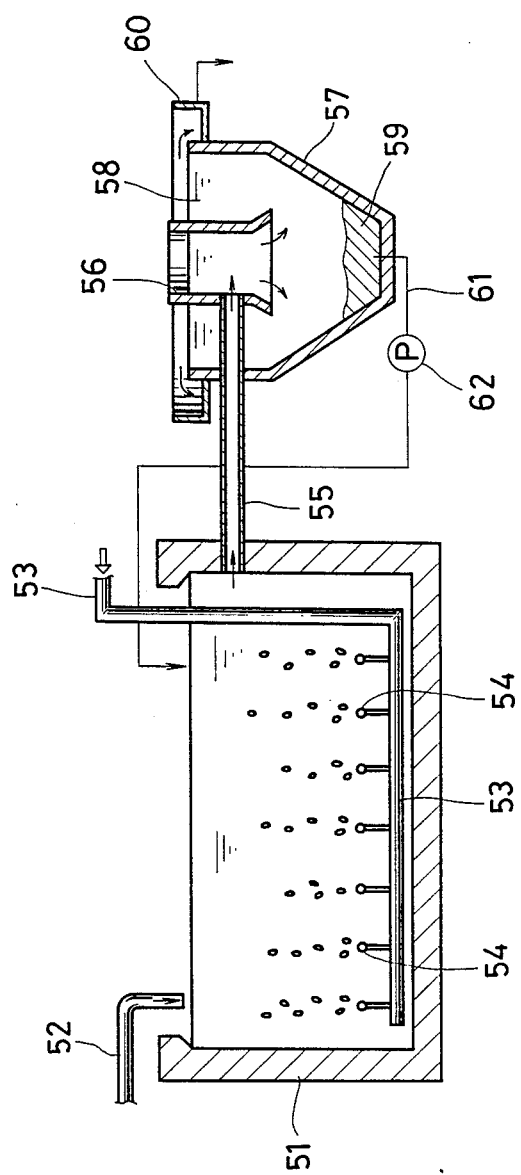
FIG. 6 is a schematic view of a conventional sewage treatment system.

FIG. 4A shows an alternative circular plate 27 coated with PVP which may be used in place of the plate 20 shown in FIG. 3A. Another arrangement in which a plurality of circular plates 27 are carried on a support is shown in FIGS. 4B and 4C. Specifically, as shown in FIGS. 4B and 4C, the circular plates 27 are mounted on a shaft 28 and are secured by a pair of clamping rings 29 with washers 30 interposed between the adjacent plates 27 so as to keep a predetermined space therebetween. The shaft 28 may be rotatably supported by suitable means in a horizontal direction slightly above the liquid level of the sewage to be treated, so that the circular plates 27 may be immersed in the sewage.

Figure 5:
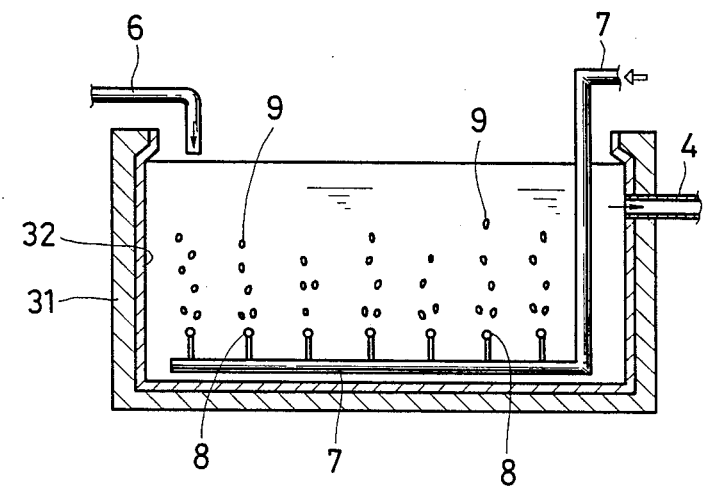
FIG. 5 is a schematic view illustrating another modification according to the present invention to the embodiment of FIG. 1.

A further modification may be made to eliminate the use of PVP particles and/or PVP-coated plates. FIG. 5 shows such a modification, and as may be seen, the sewage treatment system includes a modified aeration tank 31 having PVP-coated inner walls 32 which may be used in place of PVP particles and/or PVP-coated plates.

With the foregoing modifications in which the plate 20, the plate 27, or the PVP-lined aeration tank 31 is used, it can be appreciated that the PVP recovery tank 2 shown in FIG. 1 may conveniently be eliminated.

What is claimed is:

1. A process for treating organic sewage comprising the steps of:
    mixing sewage containing organic pollutants with activated sludge under aerobic conditions;
    bringing the mixture of said sewage and activated sludge into contact with polyvinyl pyridine, thereby producing floc; and
    separating said floc from liquid based on the difference in specific gravity.

2. The process as defined in claim 1 wherein the contact area of polyvinyl pyridine with the mixture of said sewage and activated sludge is adjusted in response to the demand on the capacity for treating activated sludge.

3. The process as defined in claim 1 wherein said mixing step is performed in an aeration tank into which said sewage and activated sludge are introduced and air is supplied.

4. The process as defined in claim 3 wherein particles of polyvinyl pyridine are added in said aeration tank, and after treating said activated sludge, said particles are settled and separated.

5. The process as defined in claim 3 wherein a plurality of plates each coated with a film of polyvinyl pyridine are immersed in said aeration tank.

6. The process as defined in claim 5 wherein said plates are vertically movably supported above said aeration tank, so that the immersion area of said plates may be adjusted by vertical movement thereof.

7. The process as defined in claim 1 wherein said step of bringing the mixture of said sewage and activated sludge into contact with polyvinyl pyridine is performed in an aeration tank having inner surfaces wholly or partly made of polyvinyl pyridine or material coated with polyvinyl pyridine.

* * * * *